Oct. 22, 1929.
F. H. GLEASON
1,732,579
LUBRICATING SYSTEM
Filed June 11, 1928
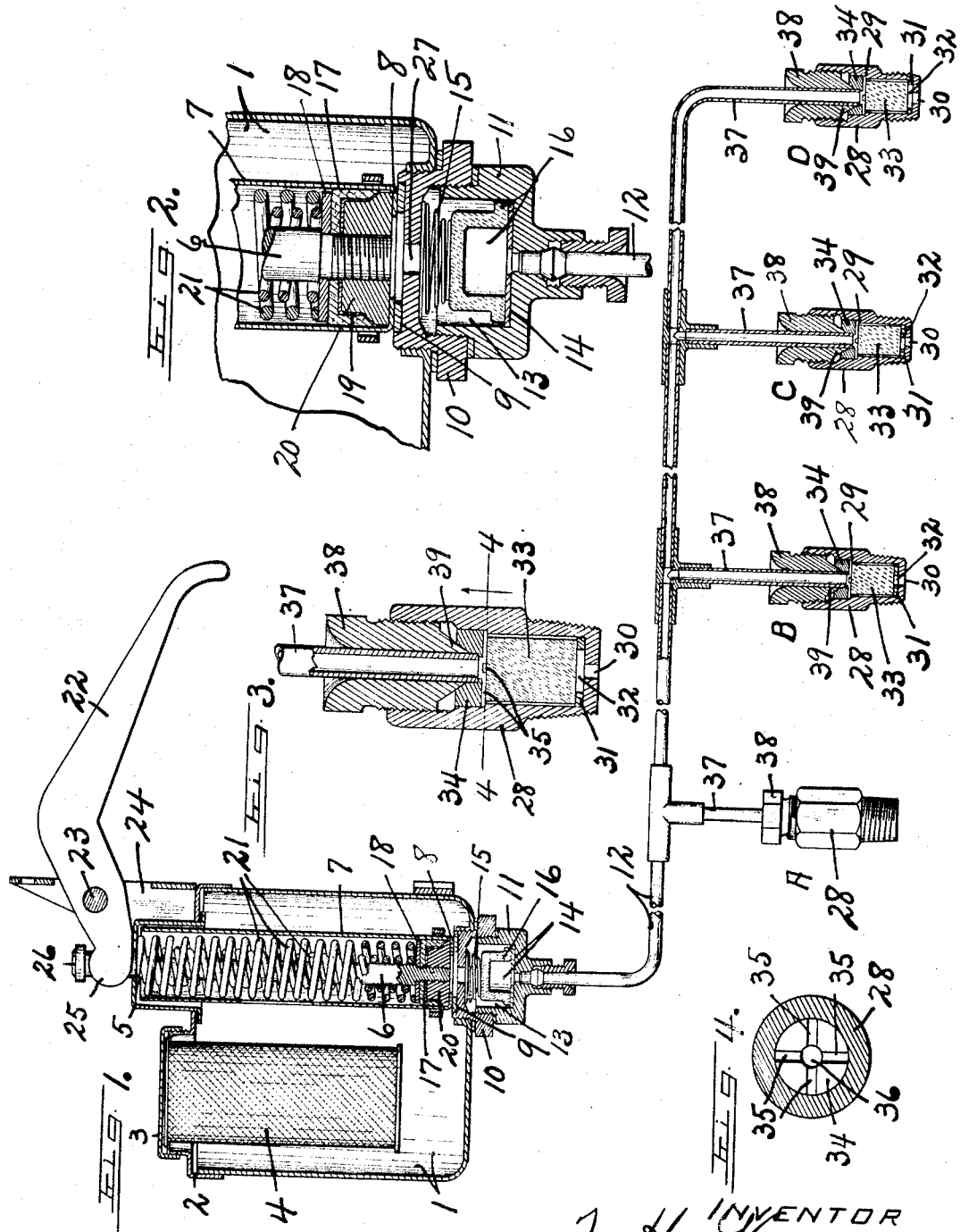

Patented Oct. 22, 1929

1,732,579

UNITED STATES PATENT OFFICE

FREDERICK H. GLEASON, OF AUBURN, NEW YORK

LUBRICATING SYSTEM

Application filed June 11, 1928. Serial No. 284,597.

This invention relates to a new and improved lubricating system designed particularly for supplying lubricant to the chassis bearings of an automobile or machine bearings wherever desired.

The invention centers around the production of a simplified highly efficient lubricating apparatus, particularly for supplying lubricant in measured quantities to a plurality of widely separated bearings connected to a single supply line at varied distances along the line from the source of supply.

The invention permits the use of a comparatively small diameter supply line and the ready and exact production of metering or measuring units for supplying predetermined desired quantities of lubricant from a single source to each bearing without regard to its distance from the source of supply and irrespective of whether similar or different quantities are required at the bearing.

Further, the invention provides measuring or metering units which control the flow of lubricant to the bearings and which will operate over long time intervals and pass large volumes of oil over such period without slowing up their flow rate or varying their predetermined desired quantity discharge.

Further, the metering units do not require the inclusion of check valves to prevent flow of lubricant to the bearings under gravity as the ceramic capillary control members or plugs will not pass oil under gravity.

Other objects and advantages relate to the details of the apparatus and the form, construction and arrangement of the parts thereof, all as will more fully appear from the following description taken in connection with the accompanying drawings, in which:

Figure 1 is a sectional view of a portion of a complete lubricating apparatus.

Figure 2 is an enlarged section of a portion of the pump structure and the filtering medium.

Figure 3 is an enlarged section through one of the control or metering units.

Figure 4 is a section on line 4—4, Figure 3.

In Figure 1 there is illustrated largely in section a portion of a complete lubricating system for an automobile or machine bearings with metering units connected at various distances from the source of supply to a single supply line for furnishing measured quantities of lubricant to four separate bearings.

The combined reservoir and pump structure illustrated consists of a reservoir —1— having a cover —2— provided with the usual filler cap —3— and oil screen —4—. The cover —2— is also provided with an elevated inverted cup shape portion —5— through which the piston rod —6— reciprocates, and within which the upper end of the piston cylinder —7— is loosely positioned and guided. The lower end of cylinder —7— is formed with an inturned annular flange —8— adapted in one position of the cylinder to rest upon the annular gasket —9— formed of soft material, such as leather or vellumoid packing, the flange upon the cylinder acting as a valve while the gasket acts as a valve seat. The gasket —9— rests upon the upper surface of an annular fitting —10— which may be threaded into the wall of reservoir —1— and is formed with an annular flange surrounding and positioning the gasket —9—. The cup-shape fitting —11— may have its upper end threaded into the interiorly threaded portion of the fitting —10— so as to form within the fitting —11— a settling sediment chamber, and in order to filter the lubricant passing from the reservoir —1— to the outlet tubing —12— there is positioned within the chamber —13— a large diameter ceramic filter disk —16— which may be of inverted cup shape form having its open end resting upon a gasket —14— formed as for instance, of vellumoid packing, and the filter is held tightly against the vellumoid gasket by spring —15— to prevent the passage of oil except through the filter disk —16— so that any oil arriving at the outlet tube 12 for supply to bearings must pass through the filter.

These filtering plugs are made of a mixture of refractory granular material such as crystalline alumina of suitable size bonded by a mixture of various vitrifiable clays fired at approximately 1300 degrees C. or other suitable temperature, to mature the bond to form a body of desired porosity, the degree of porosity being determined by the size of the grains and the relative amount of bond present. Various clays, such as ball clay and slip clay are commonly used as bond ingredients in this industry.

The piston rod —6— carries at its lower end a cup leather assembly piston including cup leather —17—, washer —18— abutting against a flange upon the piston rod, a thin metallic liner —19— and nut —20— threaded upon the piston rod to maintain the parts in desired position. At its lowermost position the nut —20— rests against the inturned flange —8— upon cylinder —7—. Downward movement of the piston assembly is effected by one or more springs —21—, in this instance two concentric spiral springs being illustrated for the purpose of obtaining the pressure required to force the oil through the filter and the metering units. These springs have their lower ends abutting against the washer —18— and their upper ends abutting against the elevated cup shape portion —5— and surround the piston rod —6— within cylinder —7—.

Suitable means is provided for effecting elevation of the piston assembly against the action of the springs in the form of lever —22— pivoted upon shaft —23— mounted on a bracket —24—, the curved end —25— of the lever resting underneath the hardened head —26— upon piston rod —6— so that by depression of the inner end of the lever —22— the piston rod —6— will be elevated, carrying the piston assembly along with it, and when such movement is initiated, the cylinder —7— being of slightly less axial length than the distance between the inner surface of the upper portion of the elevated part —5— and the gasket —9—, the friction of the piston will raise the cylinder —7— until it contacts with the wall of the elevated part —5—, leaving a narrow passageway between flange —8— and the gasket —9— to permit inflow of lubricant.

This condition continues to exist during upward movement of the piston assembly. When the piston assembly starts moving downwardly as actuated by springs —21—, the frictional stress exerted by the piston immediately moves cylinder —7— downwardly to bring flange —8— into tight contact with gasket —9— to prevent the return of the oil to the reservoir —1— from cylinder —7—, and thereupon the lubricant is forced from the cylinder through the outlet opening —27— in fitting —10— and through the filter disk or member —16— and into the outlet tube —12— which conveys it to the respective metering units A, B, C and D for supply to respective bearings.

The metering units or capillary resistance controls are generally of similar form and construction, and altho their exact size is not essential, such controls as at present constructed comprise a metallic body —28— with an external ⅛th inch pipe thread connection at the bottom.

An annular chamber formed within the body —28— is provided with a shoulder at —29— and a small hole or conduit —30— is formed at the central portion of the bottom of the body which is otherwise closed. This hole or passageway is smaller in diameter than any of the controlling vellumoid gaskets —31— about to be described. These vellumoid gaskets are of annular form and may be provided with an opening or hole —32— in their central portion of desired size to determine the proportional amount of lubricant to be supplied to respective bearings.

The annular vellumoid gasket —31— having a central opening —32— of desired size is assembled within the body —28— in contact with the lower end thereof. A ceramic plug or capillary resistance member —33— is fitted within the chamber in the body —28— and rests upon the upper surface of the gasket —31—. These ceramic capillary members as at present utilized are cylindrical plugs all of the same size, shape, area, and porosity, and fit somewhat loosely in the chamber in the body —28— and the amount of oil that will be passed through the metering units depends upon the size of the opening in the gasket —31—, as these gaskets determine the exposed area at the bottom of the ceramic resistance member —33—, and a gasket having a small hole —32— will provide a slower flow rate than a gasket having a larger hole —32—. These holes or openings through the respective gaskets are shown in the drawing as of varied sizes, the capillary resistance control at the extreme right of the drawings having the largest opening —32—, while the other openings decrease progressively in size in the control members from right to left of drawing.

In order to hold the ceramic capillary resistance controls in proper tight relation with respective gaskets —31—, there is provided a small circular disk —34— having a drive-fit in the body —28— above the ceramic plug, and the lower edge of this disk is adapted to strike against the shoulder —29— in the body bore to limit the pressure which can be applied to the ceramic plug to hold it oil-tight against the vellumoid gasket. The lower surface of the plug —34— is formed with grooves or oil passages —35— radiating from the central opening —36— to distribute the oil over the surface of the ceramic control member —33—.

The plug —34— has provision for the assembly against its upper part of the supply tube —37— which connects to the outlet tube —12—. This connection is effected by means of a tubing nut —38— having a contractual thin edge formed at the end of the tapered portion —39— and which is contracted by downward movement of the tubing nut in contact with the upwardly tapering surface on the disk —34— as the nut is threaded into the body —28—, which upwardly tapering surface surrounds the central opening —36—.

The surface of the ceramic plug which is presented to the oil passing through the metering unit acts as a filter and the area of this surface is the same in all of the plugs, and is many times greater than the area on the lower surface of the plug which is exposed through the hole —32— in the vellumoid gasket, and the size of which hole is adapted to be varied in metering units to provide different flow rates in accordance with the requirements of the respective bearings.

The rate of passage of the incoming oil into the ceramic plug is so slow in comparison to its great surface area that any sediment will tend to fall into the space between the side wall of the plug and the body —28—, and will not collect against the face of the plug and slow up its flow rate.

It should be understood that the actual flow rate through the metering unit is determined by the exposed area at the bottom of the ceramic plug, and that this area is much smaller than the filtering area of the plug exposed to the entering oil, and this construction permits the production of a flow controlling plug which will operate over long time intervals and pass large volumes of oil without slowing up its flow rate.

As an illustration, these ceramic flow controlling members when supplied with oil under approximately 100–200 pounds pressure, will feed oil very slowly (it is possible to limit the passage of a single drop over the time interval of a few seconds to 30 minutes). They will not pass any oil under gravity heads and the feed of oil through the same under four or five pounds pressure is so small that it takes approximately a week for a single drop to pass. They, therefore, act practically as check valves when used with oil of ordinary viscosity, and the tubing system delivery line or lines are maintained full of oil between the intervals when pressure is applied to the system.

In the particular embodiment of the invention here disclosed, a special form of pump is shown for delivering oil to the supply line under pressure, but such disclosure is merely illustrative, and any other means may be utilized for delivering oil to the outlet line or supply line —12—, as for instance the motor lubrication system for the engine of an automobile, as disclosed in Gleason Patent No. 1,580,823, or various forms of apparatus, as for instance that disclosed in Gleason Patent No. 1,629,453, or Gleason pending application Serial No. 138,235.

When the motor lubrication system for the engine bearings is connected to a supply line —12—, the system will slowly feed oil to the bearings only when the motor is in operation.

Further, a group of machines may be provided with a lubrication system as disclosed embodying capillary flow controls and all of the group supplied from a single source of oil under pressure, valves being provided at each individual machine which may be opened or closed in accordance with operation or non-operation of the machine.

The very slow rate of feed through the ceramic capillary flow members makes possible the use of a very small bore outlet or supply tube 12 with a very small drop in pressure at the end of the system. A ⅛th inch diameter tube with a .03 inch wall, hole .065 of an inch diameter, 50 feet long, will only show a drop from 75 pounds to 73 pounds at the end of the system, due to the very slow flow rate of oil through the tube. Such a small tube has numerous advantages, for instance, it is cheaper, easier and neater to install, and is relatively much stronger and more durable when assembled on a machine or chassis.

These filtering plugs are made of a mixture of refractory granular material such as crystalline alumina of suitable size bonded by a mixture of various vitrifiable clays fired at approximately 1300 deg. C. or other suitable temperature, to mature the bond to form a body of desired porosity, the degree of porosity being determined by the size of the grains and the relative amount of bond present. Various clays such as ball clay and slip clay are commonly used as bond ingredients in this industry.

Although I have shown and described a specific form and construction of apparatus as constituting an embodiment of the invention, I do not desire to restrict myself to the details of form, size, construction or arrangement, as various changes and modifications may be made within the scope of the appended claims.

I claim:

1. A lubricating system comprising the combination with a source of lubricant, of a metering unit for supplying lubricant to a bearing comprising a ceramic capillary member through which the lubricant passes.

2. A lubricating system comprising the combination with a source of lubricant, of a metering unit for supplying lubricant to a bearing comprising a ceramic capillary member through which the lubricant passes, and a gasket held against one end of said capillary member and determining the exposed outlet area of said member.

3. A lubricating system comprising a source of lubricant, an outlet tube leading therefrom, a metering unit connected to the outlet tube, said unit comprising a body portion, a gasket against one end of the body portion, a ceramic capillary member having one end in contact with the gasket, and means for holding the ceramic capillary member in contact with the gasket.

4. A lubricating system comprising a source of lubricant, an outlet tube leading therefrom, a metering unit connected to the outlet tube, said unit comprising a body portion, a gasket against one end of the body portion, a ceramic capillary member having one end in contact with the gasket, means for holding the ceramic capillary member in contact with the gasket, and means for limiting the movement of said holding means.

5. A lubricating apparatus comprising a source of lubricant under pressure, an outlet tube for conveying lubricant therefrom, a plurality of metering devices connected to the outlet tube for supplying lubricant to respective bearings and each of said metering devices comprising a ceramic capillary member, a gasket against one end of said member and determining the rate of flow of lubricant to respective bearings in accordance with the size of the respective openings through the gaskets.

6. In a lubricating system, the combination with a source of lubricant under pressure, means for filtering the lubricant passing from said source including a ceramic member, an outlet tube for conveying filtered lubricant therefrom, a metering unit in communication with the outlet tube, said metering unit comprising a body portion, a ceramic plug therein and a gasket between a portion of the ceramic capillary member and the body portion.

7. In a lubricating system, the combination with a source of lubricant under pressure, means for filtering the lubricant passing from said source including a ceramic member, an outlet tube for conveying filtered lubricant therefrom, a metering unit in communication with the outlet tube, said metering unit comprising a body portion, a ceramic plug therein, a gasket between a portion of the ceramic capillary member and the body portion, and a disk adapted to exert pressure upon the ceramic capillary member to hold it in contact with said gasket.

8. In a lubricating system, the combination with a source of lubricant under pressure, means for filtering the lubricant passing from said source including a ceramic member, an outlet tube for conveying filtered lubricant therefrom, a metering unit in communication with the outlet tube, said metering unit comprising a body portion, a ceramic plug therein, a gasket between a portion of the ceramic capillary member and the body portion, and a disk adapted to exert pressure upon the ceramic capillary member to hold it in contact with said gasket, said disk having a central opening and a groove leading therefrom in the face of the disk adjacent the ceramic capillary member.

In witness whereof I have hereunto set my hand this 8th day of June, 1928.

FREDERICK H. GLEASON.